United States Patent [19]

Johnson et al.

[11] Patent Number: 4,480,367

[45] Date of Patent: Nov. 6, 1984

[54] THROTTLE ASSEMBLY

[75] Inventors: Kalin S. Johnson, Northville; Daniel E. Alsobrooks, Flat Rock, both of Mich.

[73] Assignee: Colt Industries Operating Corp, New York, N.Y.

[21] Appl. No.: 364,981

[22] Filed: Apr. 2, 1982

[51] Int. Cl.³ .................... B21D 53/00; B21K 29/00; B23P 15/26

[52] U.S. Cl. .................... 29/157.1 R; 123/337; 261/65; 261/DIG. 23; 403/354; 403/355

[58] Field of Search ......... 123/337; 261/65, DIG. 23; 403/354, 355, 358; 29/157.1 R

[56] References Cited

U.S. PATENT DOCUMENTS

| | | | |
|---|---|---|---|
| 1,408,993 | 3/1922 | Eberhardt | 403/355 |
| 2,139,841 | 12/1938 | Mennesson | 261/65 |
| 2,163,997 | 6/1939 | Handy | 261/65 |
| 2,595,720 | 5/1952 | Snyder | 261/65 X |
| 2,620,821 | 12/1952 | Leibing | 123/337 X |
| 2,895,754 | 7/1959 | Wurzel | 403/355 X |
| 3,144,909 | 8/1964 | Hart et al. | 403/355 |
| 3,245,666 | 4/1966 | Marsee | 261/65 |
| 3,282,572 | 11/1966 | Karlovitz | 261/65 X |
| 3,341,185 | 9/1967 | Kennedy, Sr. | 261/65 X |
| 3,343,819 | 9/1967 | Sarto | 261/65 X |
| 3,797,949 | 3/1974 | Petros | 403/355 |
| 3,837,754 | 9/1974 | Malcik | 403/355 X |
| 4,193,948 | 3/1980 | Charmley et al. | 261/65 |

*Primary Examiner*—Charlie T. Moon
*Assistant Examiner*—Ronald S. Wallace
*Attorney, Agent, or Firm*—Walter Potoroka, Sr.

[57] ABSTRACT

A throttle controlled induction passage assembly is shown as having a body with an induction passage formed through the body and a throttle shaft extending transversely of the induction passage and carried by the body, the throttle shaft having an axis of rotation about which the throttle shaft is rotatable, a throttle valve is carried by the throttle shaft for rotation therewith, and an abutment arrangement for preventing the throttle shaft and throttle valve from experiencing undue movement relative to the induction passage in both directions along the axis of rotation; a suitable thrust bearing is provided to permit application of the body and shaft in any position.

17 Claims, 6 Drawing Figures

THROTTLE ASSEMBLY

FIELD OF THE INVENTION

This invention relates generally to the field of throttle valve means and more particularly to throttle valve means employed for variably controlling the flow through induction passage means as employed, for example, in combination with combustion engines.

BACKGROUND OF THE INVENTION

Heretofore, it has been accepted practice in the prior art to provide, for carburetors, fuel injection systems and the like, throttle valve means, carried by rotatably positionable throttle shaft means, for selectively variably controlling the rate of flow of air or motive fluid through associated induction passage means to related combustion engine means.

Usually the induction passage means, in the vicinity of the variably positionable throttle valve is, when viewed in transverse cross-section, circular. Such a circular configuration although not essential to an induction passage in, for example the vicinity of the throttle valve, is, nevertheless, the most practical and, further, does minimize the outer surface for the related available area of flow.

Generally, when viewed axially of the induction passage or bore, the throttle valve situated therein appears to be circular. However, as has been, heretofore, accepted practice, the throttle valve is, often, actually of an elliptical configuration. The adoption of an elliptical configuration as well as the degree of such elliptical configuration depends, in the main, on the angle which the throttle valve assumes with respect to the axis of the juxtaposed portion of the induction passage or bore when moved to its normal closed position, and, the amount of off-set of the throttle shaft means carrying the throttle valve.

It has been accepted practice to place the throttle shaft means in a position whereby the axis of the throttle shaft means, although contained within a plane passing normal to the axis of the induction passage or bore, is off-set some distance from but parallel to a diameter of such induction passage or bore. Consequently, the total projected area of the throttle valve generally to one side of the axis of the throttle shaft means is greater than the total projected area of the throttle valve generally to the opposite side of the axis of the throttle shaft means. The portion of the throttle valve of relatively greater area is situated in the induction passage means as to be relatively upstream of the portion of the throttle valve which is of relatively smaller effective area. This is done so that in the event the associated throttle return (closing) spring means should fail, the greater effective area of the throttle valve being disposed upstream would, because of the pressure differential thereacross and the difference in effective or projected areas of the throttle valve on opposite sides of the throttle shaft, cause the throttle valve to move toward a closed throttle condition.

In view of the foregoing, it should be apparent that, where such elliptical throttle valve configurations are employed, the distance or dimension of the throttle valve normal to the axis of the throttle shaft means (and measured to the outer-most portions therof) will be the major axis of the elliptical configuration while the distance or dimension of the throttle valve measured generally along the throttle shaft means will be the minor axis of that elliptical configuration.

Generally, in the vast majority of prior art structures, when the throttle valve is considered or referred to as being in a normally closed condition, it does not actually close all air or motive fluid flow therepast. That is, when the throttle valve is closed there is space between, generally, the periphery of the throttle and the juxtaposed surface of the induction passage which permits the flow of fluid therethrough (said space). Further, when the throttle valve is closed, such condition is referred to as idle (or idle engine operation). During relatively cold engine operation various means have been proposed by the prior art whereby when the throttle valve is closed the actual degree of closure by the throttle valve is less than the degree of closure of the throttle valve during relatively warmer or normal engine temperature operating conditions. This enables what is sometimes referred to as cold engine fast idle operation which is often necessary to sustain idle engine operation when the engine is relatively cold.

With combustion engines, of the recent past, which often had a displacement of anywhere, for example, of 300 to 460 cubic inches, slight variations, as between vehicles, in the actual space between the periphery of the throttle valve and juxtaposed surface of the induction passage, as during idle engine operation, were not of significant importance because the amount of variation was a very small percentage of the actual engine breathing rate at that time.

However, because of, among other things, governmental regultions the vehicle engines being manufactured are continually becoming smaller in displacement to where, now, an engine having a displacement of 130 cubic inches is considered to be a relatively large engine. There are now many automotive type vehicular engines which are in 1.5 liter (91.5 cubic inches) range. Many of such engines are of four cylinder configuration and, further, many of them are situated transversely of the vehicle and coupled to vehicular front wheel drive mechanisms. Of course, the vehicles employing such small engines are, themselves, small.

It should be apparent that the breathing capacity of such smaller engines (approximately 90 cubic inches) is far less than the first mentioned engines of 300 to 460 cubic inches. Therefore, if, as between vehicles employing such small engines, variations (in term of absolute area) in the actual space between the periphery of the throttle valve means and juxtaposed induction passage surface were as those experienced and easily tolerated by the relatively large engines, such variations would become intolerable because of the relatively much greater percentage of the small engine's breathing rate represented thereby.

Accordingly, it has, heretofore, become accepted practice, especially for such small engine application, to manufacture both the induction passage means and the throttle valve means to dimensions of very close (small) tolerances thereby providing for the very small opening or space (past the throttle valve means) as during closed throttle (idle) engine operation.

Even though the small engines equipped with such very accurately produced throttle-controlled induction systems initially operate in a satisfactory manner, in a relatively short time thereafter such engines may start to exhibit symptoms of general malfunction. Some of such symptoms are: (a) a possible increase in the rate of engine fuel consumption at idle; (b) an increased idle engine speed even at normal engine operating temperature; and (c) noticeable increase in resistance to throttle valve movement.

It has now been discovered that in such throttle-controlled induction passages means of such small engines which exhibited the aforestated (as well as possibly other) symptoms, a considerable degree of damage to both the surface defining the induction passage and which is generally juxtaposed to the throttle valve, and the generally peripheral surface (edge) of the throttle valve itself can exist if excessive lateral movement of the throttle shaft and throttle valve is permitted. Such damage often has the appearance of errosion. In view of such discovery, it is now concluded that the erroded-like portions actually provide, especially in terms of percentage, a much greater space for the flow of motive fluid therethrough as during idle engine operation than was originally permitted when the engine was initally provided with the high-precision-produced throttle controlled induction means and that therefore, in such engines, the idle engine speed has increased and, because of the irregularity of the juxtaposed erroded-like surface a non-uniform and increased resistance to movement of the throttle valve is often experienced.

Although it is not known for certain, it is nevertheless believed that an additional cause for the production of such eroded-like surfaces is the high degree of vibration produced by, and often inherent in, such small engines. Even if the engine is effectively vibration-isolated from the vehicle, all components, elements and accessories carried by the engine are still subjected, directly, to such engine-produced vibrations.

Accordingly, the invention as herein disclosed is primarily directed to the solution of the aforestated as well as other related and attendant problems of the prior art.

SUMMARY OF THE INVENTION

Apparatus

According to the invention a throttle-controlled induction passage assembly comprises body means, induction passage means formed through said body means, throttle shaft means extending transversely of said induction passage means and carried by body means, said throttle shaft means having an axis of rotation extending longitudinally thereof, throttle valve means carried by said throttle shaft means for rotation therewith within said induction passage means about said axis of rotation, and abutment means for at least limiting movements of said throttle shaft means in either direction along said axis of rotation.

Method

According to the invention a method of manufacturing a throttle-controlled induction passage assembly comprises the steps of forming suitable body means with an induction passage means therethrough, forming an elongated throttle shaft, securing said throttle shaft to said body means as to extend transversely of said induction passage means and to be rotatable about a longitudinal axis of said shaft, operatively effectively locking said throttle shaft to said body means as to at least limit the amount of axial movement of said throttle shaft relative to said body means, forming a throttle valve, positioning said throttle valve within said induction passage means for attachment to said throttle shaft means, positioning said throttle valve relative to the surface of said induction passage means as to have the peripheral edge of said throttle valve within a preselected relationship to said surface of said induction passage means, and then securing said throttle valve to said throttle shaft for rotation therewith about said axis.

Other general and specific objects, advantages and aspects of the invention will become apparent when reference is made to the following detailed description considered in conjunction with the accompanying drawings.

BRIEF DESCRIPTION OF THE DRAWINGS

In the drawings, wherein for purpose of clarity certain details and/or elements may be omitted from one or more views.

DETAILED DESCRIPTION OF THE PREFERRED EMBODIMENT

Figure 1:
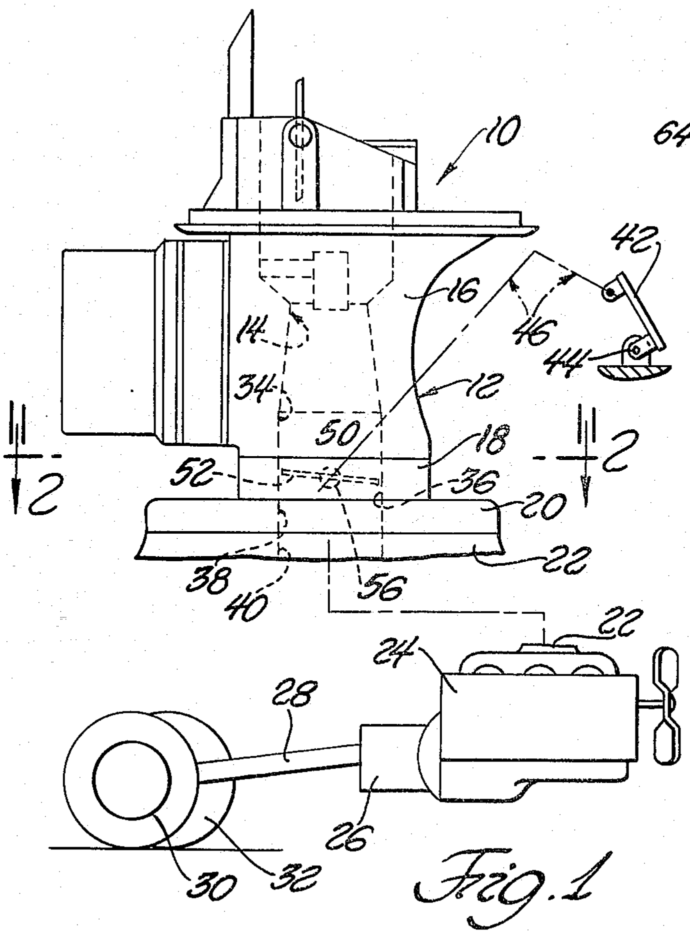
FIG. 1 is a side elevational view of a carburetor structure, employing teachings of the invention, shown in combination with a combustion engine of an associated vehicle.

Referring now in greater detail to the drawings, FIG. 1 illustrates a carburetor 10 having body means 12 with induction passage means 14 formed therethrough. As generally depicted, the overall body means 12 may be comprised of individual, that is separable, body means 16, 18 and 20 of which body means 16 may comprise the main carburetor body, wherein body means 18 may comprise what is often referred to as a throttle body, and wherein body means 20 may comprise suitable flange or mounting means for mounting the entire carburetor means 10, as an assembly, to the intake manifold means 22 of the associated engine 24. As generally depicted, the engine 24 may be operatively connected as through suitable power transmission means 26 and suitable drive means 28 as to ground drive wheel means 30, 32.

Further, as should be apparent, the overall induction passage means 14 may be comprised of serially situated and serially communicating induction passage portions or means 34, 36, 38 and 40 respectively formed through body portion 16, throttle body 18, flange means 20 and intake manifold means 22.

Figure 2:
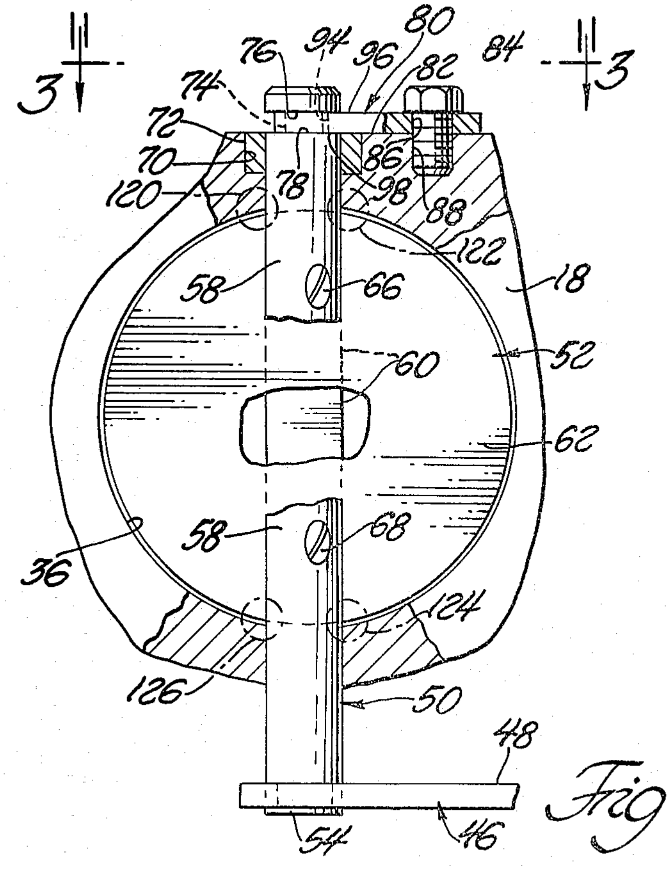
FIG. 2 is a relatively enlarged fragmentary view, with portions thereof broken away and cross-hatched, taken generally on the plane of line 2—2 of FIG. 1 and looking in the direction of the arrows.

Generally, as the vehicle operator pivotally rotates throttle pedal or lever 42 counter-clockwise about, for example, pivot means 44 (as viewed in FIG. 1) suitable interconnecting motion transmitting means 46 (of which throttle lever arm means 48, a portion of which is shown in FIG. 2, may comprise a portion thereof) operatively connected to a pivotally rotatable throttle shaft 50 serves to cause opening movement of an associated throttle valve means 52, operatively carried by throttle shaft means 50, by rotation of said throttle valve 52 and throttle shaft means 50 generally clockwise about the axis of rotation of said throttle shaft 50. The lever means 48 may be fixedly secured to the throttle shaft 50 as by, for example, being secured to suitable flatted poritons 54 thereof cooperating with mating surface means of lever means 48.

In the embodiment illustrated, throttle shaft means 50 is provided with a slot 56 formed therethrough as to receive the throttle valve means 52 therein. The slot 56 is formed generally between opposed juxtaposed shaft portions 58 and 60 which comprise flatted opposed surfaces generally containing the opposite side surfaces 62 and 64 of throttle valve 52. In FIG. 2, a part of the shaft portion 58 is broken away as to show that portion of the throttle valve 52 otherwise covered thereby, and, a part of the throttle valve 52 is broken away as to show the other generally opposed portion 60 of throttle shaft means 50. Generally, securing screws 66 and 68 are received through clearance apertures or passages formed in throttle shaft portion 58 and pass through respective clearance passages or apertures formed through throttle valve 52 and are respectively threadably received in respective internally threaded passages formed in shaft portion 60 in alignment with the passages formed in shaft portion 58. Preferably, the clearance passages or apertures formed through throttle valve 52 are significantly larger than the diametral size of screws 66, 68 as to permit a degree of movement of throttle valve 52 relatively transversely of said screws 66 and 68.

In the embodiment of FIG. 2, the housing or body means 18 is illustrated as having a counterbore 70 formed therein which receives bearing and/or sealing means 72 through which the throttle shaft 50 extends. In the preferred embodiment, throttle shaft means 50 is provided with a necked-down surface 74 of relatively smaller diameter and axially opposed generally radially extending abutment surfaces 76 and 78. A locking or abutment member 80 is shown having a portion thereof received within such groove means as comprised, generally, of cooperating surfaces 74, 76 and 78. In the preferred embodiment of the invention as illustrated in FIG. 2, a surface 82 is finish machined on or carried by body means 18 as to thereby provide for an accurate mounting surface for the mounting of abutment member 80 thereagainst as by suitable fastener means such as, for example, screw means 84, passing through an aperture 86 formed through abutment member 80, and being threadably engaged as at 88 with body means 18.

Figure 3:
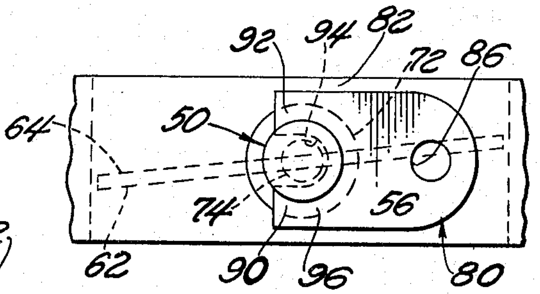
FIG. 3 is a fragmentary view taken generally on the plane of lines 3—3 of FIG. 2 and looking in the direction of the arrows.

In the embodiment of the abutment member 80, of FIGS. 2 and 3, the end or portion operatively engaging the throttle shaft means 50 is of a generally U-shaped configuration having leg poritons 90 and 92 the inner surfaces or edges of which are joined as by a radiused bight portion or edge 94. As shown in both of FIGS. 2 and 3, such leg portions 90 and 92 as well as that portion defining the radiused bight portion are closely received within the said groove means (cooperatively defined by surfaces 74, 76 and 78) as to have the outer-most surface means 96 of member 80 juxtaposed to surface 76 of means 50 and as to have the relatively inner surface means 98 of member 80 juxtaposed to surface 78 of shaft means 50.

In the embodiment of the invention, as illustrated in FIGS. 2 and 3, it should be apparent that once means 80 is operatively secured, as in the manner disclosed, that throttle shaft means 50 will be effectively locked against any undue movement in its axial direction (either way) and that the locking or abutment means will therefore prevent undue relative movement as between the throttle valve means 52, carried by the throttle shaft 50, and the surface of induction passage or bore 36 which would otherwise result due to, for example, excessive relative axial motion of shaft means 50 induced as by vibrations caused by the associated engine 24.

In the preferred embodiment the total clearance existing as between opposed surfaces 76 and 96 and as between opposed surfaces 78 and 98 is of a magnitude as to result in substantially imperceptible relative axial movement therebetween.

Figure 4:
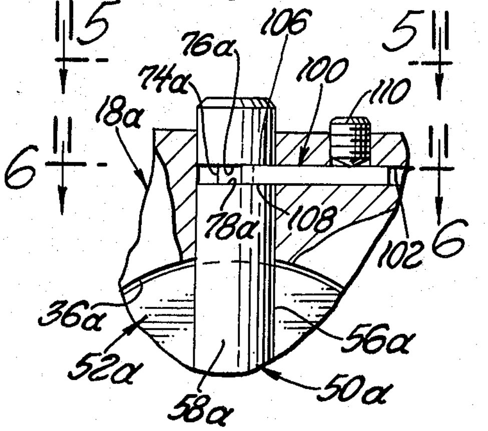
FIG. 4, a fragmentary view, similar to a portion of view of FIG. 2, illustrates a second embodiment of the invention.
Figure 5:
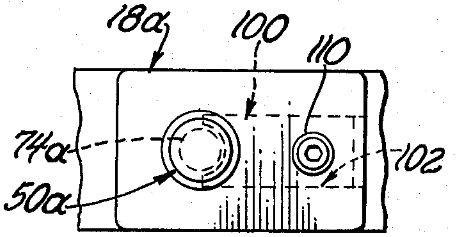
FIG. 5 is a fragmentary view taken generally on the plane of line 5—5 of FIG. 4 and looking in the direction of the arrows.
Figure 6:
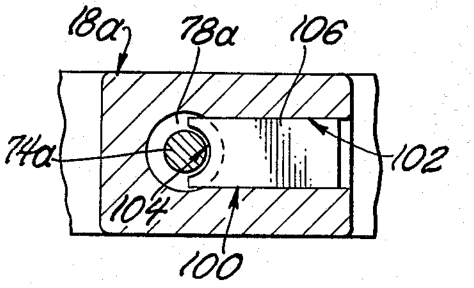
FIG. 6 is a fragmentary cross-sectional view taken generally on the plane of line 6—6 of FIG. 4 and looking in the direction of the arrows.

FIGS. 4, 5 and 6 illustrates a second embodiment of the invention. In FIGS. 4, 5 and 6, elements which are like or similar to those of FIGS. 2 and/or 3 are identified with like reference numbers provided with a suffix "a". Only so much of the structure of the previous Figures is repeated in FIG. 4 as is believed necessary to fully understand the structure and operation of the second embodiment.

Referring now in greater detail to FIGS. 4, 5 and 6, an abutment member or retainer member 100 is closely slidably received as within slot or recess means 102 formed within body means **18*a* as to have a generally arcuate end portion 104 closely received by groove means cooperatively defined by surface means 74*a*, 76*a* and 78*a*. In the preferred embodiment of the structure of FIGS. 4, 5 and 6, opposed surfaces 106 and 108 of member 100 are at a dimension with respect to each other so that when assembled, as depicted, the total clearance existing as between opposed surfaces 106 and 76*a* and as between opposed surfaces 108 and 78*a* is a magnitude as to result in substantially imperceptible relative axial movement therebetween. The abutment means or member 100 may be suitably secured by any appropriate means; as illustrated, for example, a socket-head screw 110, threadably engaged with body or housing means 18*a*, may be employed for holding the abutment means 100** in the selected assembled position.

In the embodiment of FIGS. 4, 5 and 6, as it was with reference to FIGS. 2 and 3, it is apparent that once means 100 is operatively secured, as in the manner disclosed, that throttle shaft means **50*a* will be effectively locked against any undue movement in either of its axial directions and that the locking or abutment means will therefore prevent undue relative movement as between the throttle valve means 52*a*, carried by the throttle shaft 50*a*, and the surface of induction passage or bore 36*a* which would otherwise result due to excessive relative axial motion of shaft means 50*a* induced as by, for example, vibrations caused by the associated engine 24**.

In the preferred form of the embodiment of FIGS. 4, 5 and 6, the total clearance existing as between opposed surfaces **76*a* and 106 and as between opposed surfaces 78*a* and 108** is of a magnitude as to result in substantially imperceptible relative axial movement therebetween.

The invention has been illustrated in a form wherein throttle body means 18 and throttle valve means 52 are situated generally horizontally and form a portion of an overall carburetor assembly. It should be made clear that the practice of the invention is not so limited; that is, the relative attitude of the induction passage poriton 36, throttle body means 18, throttle valve means 52 and throttle shaft means 50 may be any that is desired to meet the requirements of any induction system. Further, the practice of the invention is not limited to, for example, the use thereof within an overall carburetor assembly.

Also, it should be made clear that the practice of the invention encompasses, at least: (a) structure where the axis of rotation of the throttle shaft means 50, even though generally parallel to a major transverse axis of the induction passage means 36 is, nevertheless, eccentrically disposed relative thereto and (b) structures where the axis of rotation of the throttle shaft means 50 is generally coincident with a transverse axis of the induction passage means 36.

It should also be apparent that the practice of the invention is not limited to the employment of throttle shaft means as specifically illustrated and hereinbefore described. Any such pivoting or journalling means, for operatively carrying and positioning the throttle valve means, may, of course be employed. Further, the throttle shaft or journalling means 50 (as well as 50*a*) has been described as being of the type wherein a slot 56 is formed therethrough and through which the throttle valve means 52 (as well as 52*a*) is received and in which such throttle valve means is ultimately secured. As by way of further example, such throttle shaft or journalling means 50 (and 50*a*) could be of the form wherein the portion thereof extending through the induction passage would be a "half shaft", that is, much like a cylinder cut generally longitudinally parallel to its central or longitudinal axis thereby providing only one flatted surface against which the throttle valve means 52 would be securely mounted, as by means of, for example, screws such as 66, 68.

Further, it has been discovered in the prior art that binding and resulting wear sometimes occurred, as between the surface of the induction passage or bore and that juxtaposed portion of the throttle valve situated close to throttle shaft means, because of relative rates, in terms of time, of thermal expansion. That is, it is believed, that because of relative masses involved, it is quite possible that, for example, the throttle valve 52 may in fact start, more quickly, to expand than the juxtaposed of the induction passage 36. If such juxtaposed portions of the throttle valve and induction passage were initially situated either against each other or too close to each other the thermal expansion first induced into the throttle valve 52 might cause binding and/or other damage to such juxtaposed surfaces. Accordingly, it is further contemplated that a preferred method be employed in the construction of the apparatus herein disclosed.

METHOD

The preferred method of the invention would comprise the steps of forming, from suitable body means, induction passage means therethrough, forming throttle shaft means, securing the throttle shaft means to the body means as to have the throttle shaft means extend transversely of the induction passage means and to be rotatable about the axis of the throttle shaft means, operatively locking the throttle shaft means to the body means as to at least limit the amount of axial movement of the throttle shaft means relative to the body means, forming a throttle valve, operatively connecting the throttle valve to the throttle shaft means, positioning said throttle valve relative to the surface of the induction passage means as to have the peripheral edge of the throttle valve within a preselected relationship to the surface of the induction passage means, and then securing the throttle valve to the throttle shaft means for rotation therewith generally about the axis of the throttle shaft means. With greater particularity to, for example, FIG. 2, the throttle body means or induction passage body means 18 could, according to the said method, pivotally or rotatably receive the shaft or journal means 50 and have such shaft means 50 effectively locked against undue relative axial motion thereof by the abutment means comprising abutment member 80. The throttle valve 52, situated in slot 56 could be somewhat loosely held in assembled condition by the screws 66 and 68 being partially tightened. A feeler-type or other suitable gauging means could then be employed to make sure that the throttle valve 52 was not either against or too close to the juxtaposed surface of the induction passage 36 as in the vicinity of the throttle shaft means 50. Such guaging could be accomplished, for example, by using wire-like gauging stock of preselected diameter, as for example 0.005 inch which could be inserted as between the periphery of the throttle valve 52 and juxtaposed surface of induction passage 36 to thereby establish an absolute minimum clearance. Preferably, such areas or gauging locations would be within the areas generally designated by phantom line circles 120, 122, 124 and 126 of FIG. 2 and, more particularly immediately next to the shaft means 50, on both sides thereof (as viewed in FIG. 2) and between the periphery of the throttle valve 52 (at such point) and the juxtaposed surface of the induction passage means 36. One such preselected minimum clearance would be established (in the case of the embodiment of FIG. 2) the screws 66 and 68 would then be fully tightened as to thereby fixedly secure the throttle valve 52 to the shaft means 50. Since the shaft means 50 is effectively secured against relative axial motion, the preselected space between the peripheral edge of the throttle valve and the juxtaposed portion of the induction passage 36 would prevent any damage occurring thereto either as, in the prior art, caused by induced vibrations or thermal expansions.

Although only a preferred embodiment and selected modifications of the invention have been disclosed and described, it is apparent that other embodiments and modifications of the invention are possible within the scope of the appended claims.

What is claimed is:

1. A throttle controlled induction passage assembly comprising body means, induction passage means formed through said body means, throttle shaft means extending transversely of said induction passage means and carried by said body means, said throttle shaft means having an axis of rotation extending longitudinally thereof, throttle valve means carried by said throttle shaft means for rotation therewith generally within said induction passage means about said axis of rotation, abutment means for at least limiting movement of said throttle shaft means in both directions along said axis of rotation, wherein said abutment means comprises an abutment member fixedly secured to said body means, and flange-like surface means carried by said throttle shaft means, said abutment member and said flange-like surface means being juxtaposed to each other whereby said abutment member is in the path of movement of said flange-like surface means in a direction along said axis of rotation.

2. A throttle controlled induction passage assembly according to claim 1 wherein said flange-like surface mans comprises first and second flange-like surface means, wherein said first flange-like surface means is juxtaposed to said abutment member at one side thereof, and wherein said second flange-like surface means is juxtaposed to said abutment member at a second side thereof opposite to said one side.

3. A throttle controlled induction passage assembly according to claim 1 and further comprising slot means formed through said throttle shaft means, and wherein said throttle valve means extends through said slot means and is secured therein against movement relative to said throttle shaft means.

4. A throttle controlled induction passage assembly according to claim 3 wherein said flange-like surface means comprises first and second flange-like surface means, wherein said first flange-like surface means is juxtaposed to said abutment member at one side thereof, and wherein said second flange-like surface means is juxtaposed to said abutment member at a second side thereof opposite to said one side.

5. A throttle controlled induction passage assembly comprising body means, induction passage means formed through said body means, throttle shaft means extending transversely of said induction passage means and carried by said body means, said throttle shaft means having an axis of rotation extending longitudinally thereof, throttle valve means carried by said throttle shaft means for rotation therewith generally within said induction passage means about said axis of rotation, abutment means for at least limiting movement of said throttle shaft means in both directions along said axis of rotation, wherein said abutment means comprises an abutment portion fixedly carried by said body means, and flange-like surface means carried by said throttle shaft means, said abutment portion and said flange-like surface means being juxtaposed to each other whereby said abutment portion is in the path of movement of said flange-like surface means in a direction along said axis of rotation.

6. A throttle controlled induction passage assembly according to claim 5 wherein said flange-like surface means comprises first and second flange-like surface means, wherein said first flange-like surface means is juxtaposed to said abutment portion at one side thereof, and wherein said second flange-like surface means is juxtaposed to said abutment portion at a second side thereof opposite to said one side.

7. A throttle controlled induction passage assembly according to claim 5 and further comprising slot means formed through said throttle shaft means, and wherein said throttle valve means extends through said slot means and is secured against movement relative to said throttle shaft means.

8. A throttle controlled induction passage assembly according to claim 7 wherein said flange-like surface means comprises first and second flange-like surface means, wherein said first flange-like surface means is juxtaposed to said abutment portion at one side thereof, and wherein said second flange-like surface means is juxtaposed to said abutment portion at a second side thereof opposite to said one side.

9. A throttle controlled induction passage assembly comprising body means, induction passage means formed through said body means, throttle shaft means extending transversely of said induction passage means and carried by said body means, said throttle shaft means having an axis of rotation extending longitudinally thereof, throttle valve means carried by said throttle shaft means for rotation therewith generally within said induction passage means about said axis of rotation, and abutment means for at least limiting movement of said throttle shaft means in both directions along said axis of rotation, wherein said abutment means comprises an annular groove formed in said throttle shaft means, and an abutment portion fixedly secured to said body means and closely received within said groove.

10. A throttle controlled induction passage assembly according to claim 9 wherein said abutment portion comprises an abutment member, and further comprising mounting surface means carried by said body means, and wherein said abutment member is fixedly secured against said mounting surface means.

11. A throttle controlled induction passage assembly according to claim 9 wherein said abutment portion comprises an abutment member, and further comprising slot means formed in said body means, and wherein said abutment member is received within said slot means.

12. A throttle controlled induction passage assembly comprising body means, induction passage means formed through said body means, throttle shaft means extending transversely of said induction passage means and carried by said body means, said throttle shaft means having an axis of rotation extending longitudinally thereof, throttle valve means carried by said throttle shaft means for rotation therewith generally within said induction passage means about said axis for rotation, and abutment means for at least limiting movement of said throttle shaft means in both directions along said axis of rotation, wherein said abutment means comprises an annular groove formed in said throttle shaft means, said annular groove comprising axially spaced first and second generally radiating surface means, and wherein said abutment means further comprises an abutment portion fixedly secured to said body means and closely received between said first and second generally radiating surface means.

13. A throttle controlled induction passage assembly according to claim 12 wherein said abutment portion comprises a separate abutment member, and further comprising mounting surface means carried by said body means, and wherein said abutment member is fixedly secured against said mounting surface means.

14. A throttle controlled induction passage assembly according to claim 12 wherein said abutment portion comprises a separate abutment member, and further comprising slot means formed in said body, and wherein said abutment member is received within said slot means.

15. A throttle controlled induction passage assembly according to claim 12 wherein said annular groove is formed in and totally circumferentially about said throttle shaft means.

16. A throttle controlled induction passage assembly comprising body means, induction passage means formed through said body means, throttle shaft means extending transversely of and through said induction passage means and being carried by said body means, said throttle shaft means having an axis of rotation extending longitudinally thereof, throttle valve means fixedly carried by said throttle shaft means for rotation therewith generally within said induction passage means about said axis of rotation, said induction passage means comprising induction passage surface means, wherein said throttle shaft means in extending transversely through said induction passage means passes through first and second openings formed in said induction passage surface means, wherein said first and second openings are in axial alignment with each other and generally at opposite sides of said induction passage means, wherein said throttle valve means is fixedly carried by said throttle shaft means in a manner whereby first and second generally opposite portions of said throttle valve means are respectively juxtaposed to said first and second openings and first and second portions of said induction passage surface means respectively adjacent to and in the vicinity of said first and second openings, and abutment means for at least limiting movement of said throttle shaft means and said throttle valve means in both directions along said axis of rotation, such a limitation of movement of said throttle shaft means along said axis of rotation being to the degree whereby said first and second generally opposite portions of said throttle valve means are prevented from striking said first and second portions of said induction passage surface means respectively.

17. A throttle controlled induction passage assembly comprising body means, induction passage means formed through said body means, throttle shaft means extending transversely of said induction passage means and carried by said body means, said throttle shaft means having an axis of rotation extending longitudinally thereof, throttle valve means fixedly carried by said throttle shaft means for rotation therewith generally within said induction passage means about said axis of rotation, and abutment means for at least limiting movement of said throttle shaft means and said throttle valve means in both directions along said axis of rotation, said abutment means being effective to prevent said throttle valve means from striking said induction passage means in both directions along said axis of rotation.

* * * * *